United States Patent [19]
Shimakawa

[11] Patent Number: 6,052,493
[45] Date of Patent: *Apr. 18, 2000

[54] IMAGE DATA COMPRESSION/EXPANSION SYSTEM HAVING AN ANALOG INTERPOLATION MIX

[75] Inventor: Joji Shimakawa, Tokyo, Japan

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,096

[22] Filed: Apr. 3, 1996

[30] Foreign Application Priority Data

Apr. 14, 1995 [JP] Japan ................................. 7-113588

[51] Int. Cl.[7] .................................................. G06K 9/32
[52] U.S. Cl. ......................... 382/300; 382/246; 382/263
[58] Field of Search ..................... 341/33, 67; 358/427, 358/525, 428; 382/246, 263, 266, 299, 300, 242; 395/139; 345/50, 87, 103, 439

[56] References Cited

U.S. PATENT DOCUMENTS

| | | | |
|---|---|---|---|
| 3,810,138 | 5/1974 | Thompson et al. | 340/815.53 |
| 4,982,294 | 1/1991 | Morton et al. | 358/465 |
| 5,010,504 | 4/1991 | Lee et al. | 364/574 |
| 5,130,820 | 7/1992 | Hirota | 358/447 |
| 5,293,580 | 3/1994 | Shimizu | 382/243 |
| 5,327,242 | 7/1994 | Naimpally et al. | 348/606 |
| 5,610,628 | 3/1997 | Yamamoto et al. | 345/208 |

OTHER PUBLICATIONS

Russ, The Image Processing Handbook, 1994, pp. 225 and 232. Second ed.

Primary Examiner—Amelia Au
Assistant Examiner—Timothy M. Johnson
Attorney, Agent, or Firm—Steven R. Biren

[57] ABSTRACT

An image data compression/expansion system capable of compressing/expanding image data at a high speed and less costs is provided. The system includes an image data compression device provided with an extraction circuit for extracting, from pixel information of an image composed of pixels, characteristic data each representing a characteristic value, such as a luminance and a color difference of a pixel, which is of significance for the image, and a position data of such a significant pixel, and includes an image data expansion device which interpolatingly forms characteristic data of all the pixels of the image from the characteristic and position data of the significant pixels. The image data expansion device includes an interpolation matrix (214) having signal points (Pij) interconnected through impedance elements (300, 301) and a characteristic data supplying arrangment responsive to the position and characteristic data fed from the image data compression device for supplying these characteristic data to those of the signal points (Pij) which are indicated by the position data, respectively, so that the characteristic data of all the pixels which have been formed by the interpolation are obtained at the respective signal points (Pij) of the interpolation matrix.

10 Claims, 4 Drawing Sheets

IMAGE DATA COMPRESSION/EXPANSION SYSTEM HAVING AN ANALOG INTERPOLATION MIX

BACKGROUND OF THE INVENTION

1. Field of Invention

The present invention relates to an image data compression/expansion system which is capable of compressing and expanding image information at a very high speed, with the provision of an image data expansion device of a purely hardware-oriented structure.

2. Description of the Related Art

There have conventionally been proposed various kinds of image data compression/expansion techniques. In general, a data compression of this kind is achieved by subjecting digitized image data to an arithmetic processing based on a predetermined algorithm such as a prediction coding (for example, ADPCM) and a transform coding (for example, DCT). The thus compressed image data can then be expanded by decoding such that it is subjected to an arithmetic processing based on an algorithm which is an inverse of that for the compression. These compression processing and expansion processing are usually carried out with a high-speed digital signal processor.

However, since the above-described conventional image data compression/expansion techniques are based on the arithmetic processing of digital image data, there is a certain limit in processing speed even when a high-speed processor of exclusive use for arithmetic operation is used. In addition, such a high-speed processor is generally very expensive, so that the cost of the system as a whole will become also very high.

SUMMARY OF THE INVENTION

It is therefore an object of the present invention to provide a system which is capable of compressing/expanding image data at a very high speed and at less cast but in which the data expansion is not carried out through digital arithmetic operations as is in the conventional image data compression/expansion techniques.

For achieving the above object according to the present invention, an image data compression/expansion system provided with an image data compression device having extraction means for extracting, from pixel information of an image constituted by pixels, characteristic data representing characteristic values of those pixels which are of significance for the image and position data of these significant pixels, and with an image data expansion device for interpolatingly forming characteristic data of all the pixels of the image from the characteristic and position data of the significant pixels, is characterized in that the image data expansion device comprises:

an interpolation matrix having signal points corresponding to the respective pixels of the image and interconnected through impedance elements; and characteristic data supplying means responsive to the characteristic and position data fed from the image data compression device for supplying the characteristic data to those of the signal points of the interpolating matrix which are indicated by the position data, so that characteristic data of all the pixels of the image are interpolatingly formed at the respective signal points of the interpolation matrix.

With the above structure, an image data expansion is performed with the interpolation matrix in a completely hardware-oriented manner, i.e, without the need for any arithmetic operations based on a certain algorithm, so that the expansion is done at a very high speed and a circuit necessary therefor will be cheap.

In an image data compression/expansion system of the above structure, the impedance elements in the interpolation matrix may be resistive elements or capacitive elements. An interpolation matrix of such structure can easily be built on a substrate by means of the conventional semiconductor technology.

In the case where an image treated in the above system is a two-dimensional image, the extraction means in the image data compression device may comprise a two-dimensional quadratic differential filter which sequentially receives pixel information of the image in a predetermined order and a threshold circuit which detects each pixel corresponding to the pixel information, for which an absolute value of an output of the filter exceeds a predetermined value, as a significant pixel. In this case, if the extraction means is constituted so as to further extract those pixels which are distributed at a predetermined constant interval over the two-dimensional image as significant pixels or if the extraction means further comprises a noise generating circuit for introducing noises in the pixel information fed to the two-dimensional quadratic differential filter, an image data compression/expansion can be achieved with a high picture quality even with respect to a picture which includes a portion having little luminance variation.

When an image data compression device according to the invention further comprises a variable length encoder for converting the characteristic data of each significant pixel into a code having a variable length, a more efficient data compression can be achieved. In this case, the data expansion device will need a variable length decoder corresponding the above encoder.

In an image data compression/expansion system according to the present invention, by providing a liquid crystal display matrix having pixel electrodes to be driven by voltages formed based on the voltages corresponding to the characteristic data obtained at the respective signal points of the interpolation matrix, a very simple high-speed image reproducing apparatus can be constructed. In this case, the above interpolation matrix and the display matrix can easily be formed on the same substrate by means of the known semiconductor integration technology. The display matrix used may be of any type if it comprises pixel electrodes arranged in a matrix.

A second aspect of the invention provides an image data expansion device for interpolatingly forming characteristic data of all pixels of an image from received characteristic data representing characteristic values of those pixels which are of significance for the image, and from received position data of these significant pixels, characterized in that the image data expansion device comprises an interpolation matrix having signal points corresponding to the respective pixels of the image and interconnected through impedance elements, and characteristic data supplying means responsive to the received characteristic and position data for supplying the received characteristic data to those of the signal points of said interpolating matrix which are indicated by the received position data, so that characteristic data of all the pixels of the image are interpolatingly formed at the respective signal points of said interpolation matrix. A third aspect of the invention provides an image data compression having extraction means for extracting, from pixel information of an image constituted by pixels, characteristic data representing characteristic values of those pixels which are of significance for the image and position data of these significant pixels, characterized in that the image is a two-dimensional image and in that the extraction means comprises a two-dimensional quadratic differential filter which sequentially receives the pixel information of the image in a predetermined order and a threshold circuit which detects each pixel corresponding to the pixel information, for which an absolute value of an output of said filter exceeds a predetermined value, as the significant pixel. These second and third aspects can advantageously be used in the image data compression/expansion system as descripted above.

BRIEF DESCRIPTION OF THE DRAWINGS

Embodiments of the present invention will now be described with reference to the accompanying drawings, in which.

DESCRIPTION OF THE PREFERRED EMBODIMENTS

A camera/display system for two-dimensional monochromatic images, to which an image data compression/expansion system according to an embodiment of the invention has been applied, will be described hereinafter. In the following description, luminance of each pixel is used as a characteristic value of the pixel.

Figure 1:
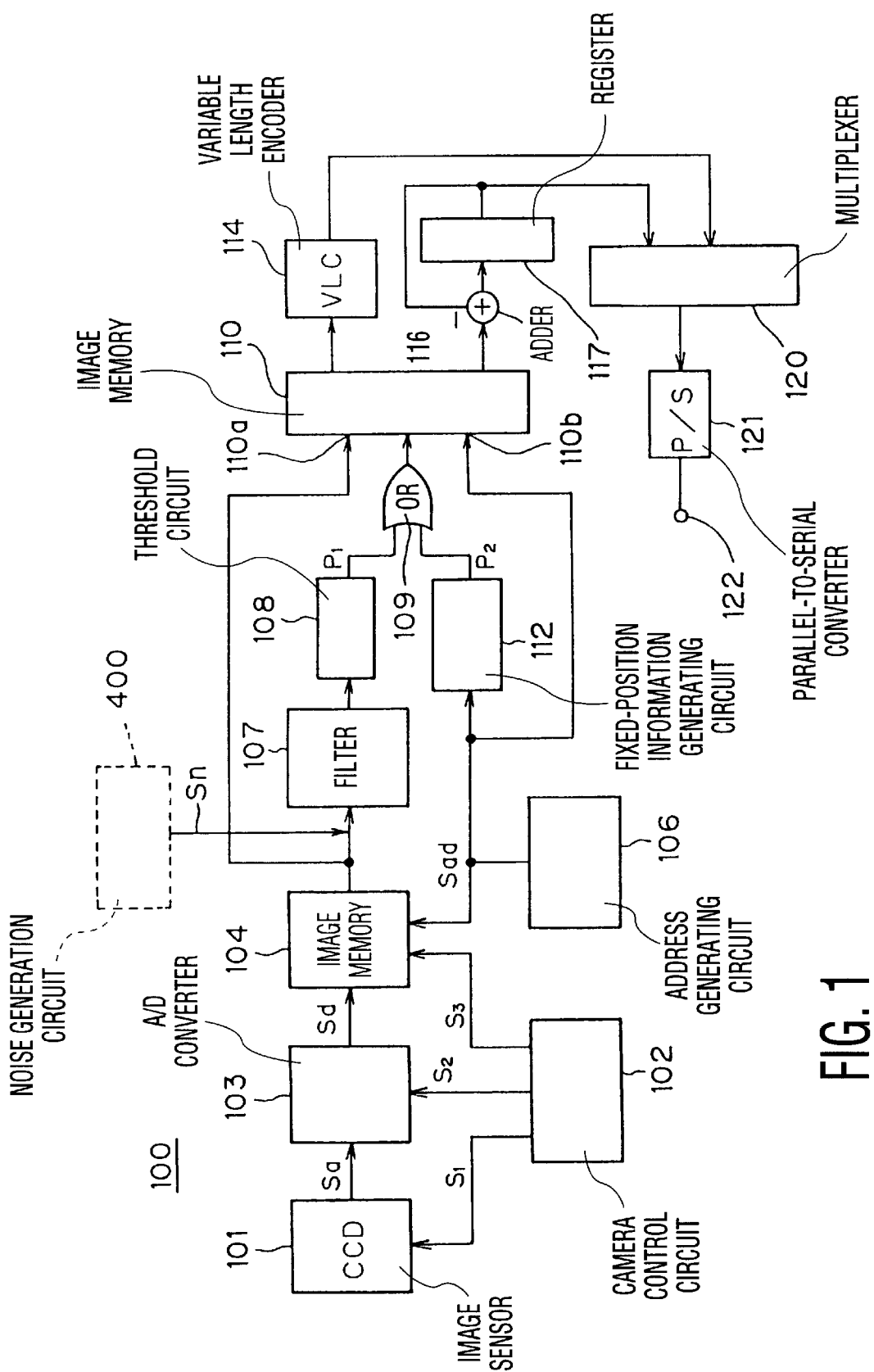
FIG. 1 is a block diagram of a camera device in a camera/display system to which an image data compression/expansion system according to an embodiment of the invention, is applied.

FIG. 1 shows a structure of a camera device 100 in the camera/display system. This device 100 comprises a CCD image sensor 101 which picks up an image in accordance with control signals S1 fed from a camera control circuit 102 and supplies an analog image signal Sa representing luminance of each pixel of the image to an analog-to-digital converter (AD converter) 103, for example, in the conventional scanning manner. This AD converter 103 converts the analog image signal Sa for each pixel into a digital image signal Sd of a predetermined number of bits (for example, eight bits) in accordance with timing signals S2 from the control circuit 102 and supplies the signal Sd to an image memory 104. The image memory 104 has storage addresses whose number is equal at least to the number of pixels in a frame or a field of image and sequentially stores the digital image signals Sd in these addresses in accordance with timing signals S3 fed from the control circuit 102. Thus, the image memory 104 always stores the newest image data of at least one frame or field.

The image data thus stored in the image memory 104 are sequentially read therefrom in accordance with an address signal Sad fed from an address generating circuit 106 and supplied to a two-dimensional quadratic differential filter 107. This two-dimensional quadratic differential filter 107 is a digital filter of the conventional structure having a characteristic, for example, of:

$$\begin{matrix} 0 & -1 & 0 \\ -1 & 4 & -1 \\ 0 & -1 & 0 \end{matrix}$$

which differentiates the image data fed from the memory 104 and supplies an output to a threshold circuit 108. The threshold circuit 108 outputs a pulse signal P1 when an absolute value of the output from the filter 107 exceeds a predetermined value. More specifically, the two-dimensional quadratic filter 107 and the threshold circuit 108 cooperate with each other to detect the image data representing significant pixels (for example, the pixels which are located in those portions of a picture where the luminance of pixels abruptly changes such as at a contour of an object in the picture) and output a pulse signal P1 at the time when such a significant pixel is detected. The pulse signal P1 is supplied through an OR gate 109 to a second image memory 110 as a write pulse. On the other hand, each image data read out of the image memory 104 is supplied to a first data input terminal 110a of the second image memory 110. In this manner, when a writer pulse corresponding to the pulse signal P1 is supplied to the second image memory 110, image data of a significant pixel corresponding to that pulse signal P1 is present at the first data input terminal 110a of the memory 110.

The address signal Sad (or address data) from the address generating circuit 106 is also supplied to a second data input terminal 110b of the second image memory 110 as data to be written therein and further to a fixed-position information generating circuit 112. This fixed-position information generating circuit 112 is a circuit for generating a pulse signal P2 each time the received address data Sad corresponds to any one of predetermined pixel positions in a two-dimensional picture, for example, a plurality of pixel positions distributed over the picture at equal intervals from one another. This circuit 112 can be constructed, for example, by comprising a comparator which compares a predetermined number of lower bits of each address data Sad with predetermined values stored in advance therein. The pulse signal P2 generated by the circuit 112 is supplied through the OR gate 109 to the second image memory 110 as a write pulse. In this way, the second image memory 110 is supplied not only with the pulse signal P1 which is generated in correspondence with each significant-pixel position in a picture but also with the pulse signal P2 which is generated in correspondence with each of the predetermined number of pixel positions distributed over the picture at equal intervals, as write pulses.

The image memory 110 comprises storage addresses, whose number may theoretically be less than the number of pixels in one picture, in which respective pairs of the image data fed to the first data input terminal 110a and the address data fed to the second data input terminal 110b are sequentially stored in accordance with the write pulses. The respective data thus stored in the memory 110 are sequentially read therefrom by means of a read circuit (not shown), wherein the read image data are supplied to a variable length encoder (VLC) 114 while the read address data are supplied through an adder 116 to a register 117.

The variable length encoder 114 is of the conventional structure and converts those data having values which appear at higher rates into shorter codes and those data having values which appear at lower rates into longer codes. If it is desired to keep a bit rate of the output of the variable length encoder 114 constant, this output should be fed back to the threshold circuit 108 to cause the threshold value in the circuit 108 to change accordingly. The adder 116 is so constructed as to subtract data fed from the register 117 from the address data fed from the second image memory 110 and to supply the subtraction results to the register 117 as position data. Therefore, the register 117 may have bit positions which are sufficient in number to represent the maximum distance between two adjacent ones of the plurality of positions in a picture determined by the fixed-position information generating circuit 112.

The image data codes from the variable length encoder 114 and the position data from the register 117 are combined by a multiplexer 120 in a correlated form and then converted into serial data by a parallel-to-serial converter 121, which serial data is supplied to a terminal 122. The serial data thus obtained at the terminal 122 is transmitted through transmission media, such as optical or magnetic record media, a communication cable or the air (in the case of a radio wave signal), to a receiving side.

Figure 2:
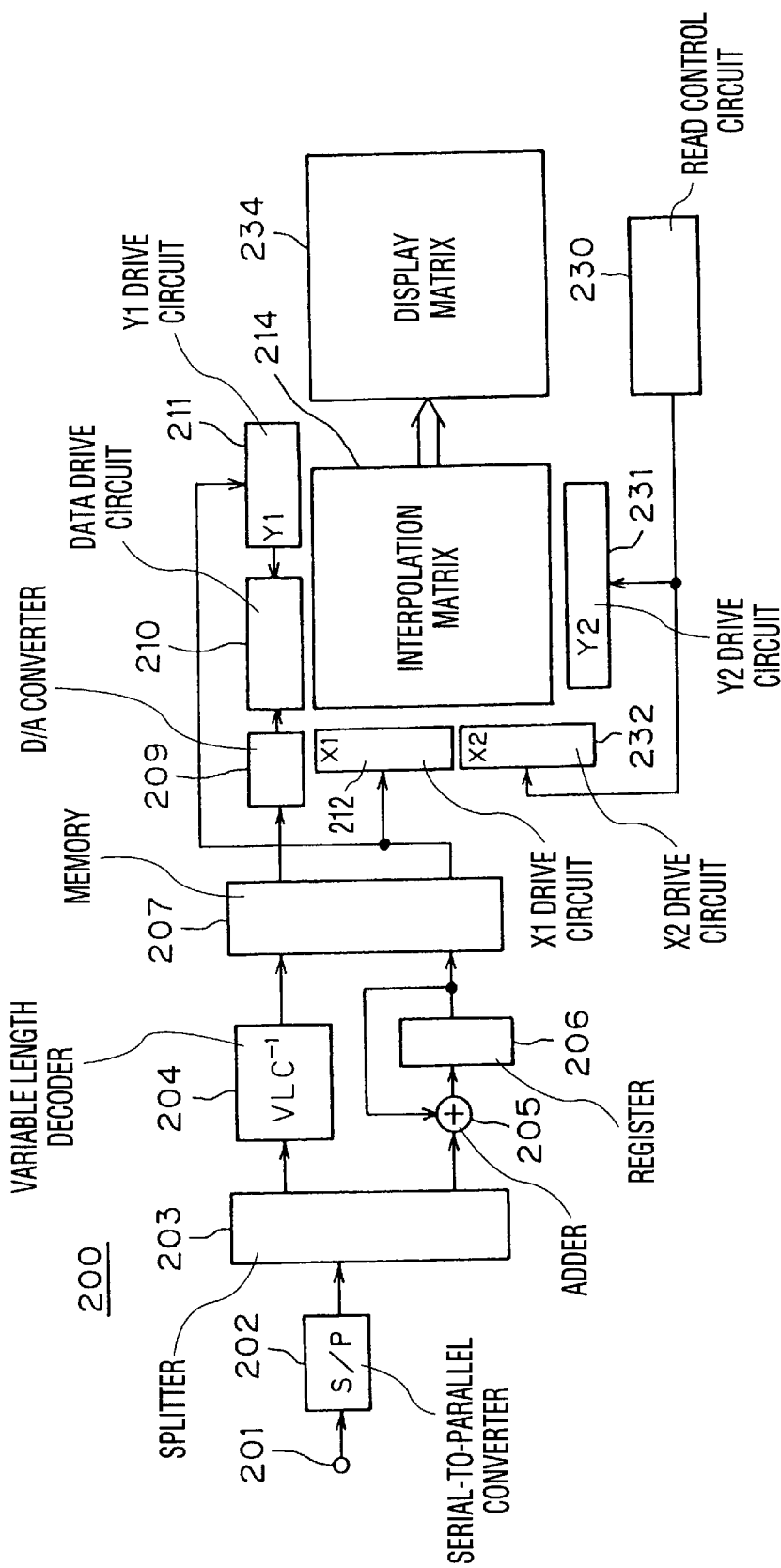
FIG. 2 is a block diagram an image reproducing device in a camera/display system, to which an image data compression/expansion system according an embodiment of the invention, is applied.

FIG. 2 shows the structure of an image reproducing device 200 in the camera/display system. The image reproducing device 200 receives at its terminal 201 the signal transmitted by the camera device 100 through the transmission media. The signal thus received at the terminal 201 is converted into parallel data by a serial-to-parallel converter 202 and is then split by splitting 203 into the image data codes and the position data which are supplied to a variable length decoder 204 and an adder 205, respectively. The variable length decoder 204 performs an operation, which is an inverse of the operation made by the variable length encoder 114, on the variable-length image data codes to reconvert same into the image data of the predetermined bit length (eight bits, for example). On the other hand, the adder 205 adds an output of a register 206 to the above position data and supplies the addition results to the register 206. The thus obtained image data and the address data in pairs are sequentially supplied to a memory 207. The memory 207 may substantially be the same in structure and capacity as the second image memory 110.

The respective data stored in the memory 207 are sequentially read therefrom by means of a not-shown read circuit. In this case, each read image data (i.e., digital image data representative of luminance of each significant pixel) is converted by a digital-to-analog converter (DA converter) 209 into an analog image signal (a voltage luminance signal) and then supplied to a data drive circuit 210. On the other hand, each address data is supplied to a Y1 drive circuit 211 and an X1 drive circuit 212. In this case, a predetermined number of lower bits of the address data are supplied to the Y1 drive circuit 211 while the remaining higher bits of the same address data are supplied to the X1 drive circuit 212. The Y1 drive circuit 211 and the X1 drive circuit 212 decode the respective address data supplied thereto to drive Y1 selection lines and X1 selection lines (not shown) of an interpolation matrix 214, which will later be described, respectively. The data drive circuit 210 may be constituted, for example, by comprising tri-state buffer amplifiers corresponding in number to the pixels in one horizontal line of a picture. In this case, any of the buffer amplifiers is made active each time by an output of the Y1 drive circuit 211. The thus activated buffer amplifier amplifies the analog image signal fed from the DA converter 209 and supplies the amplified signal to the corresponding data line of the interpolation matrix 214.

Figure 3:
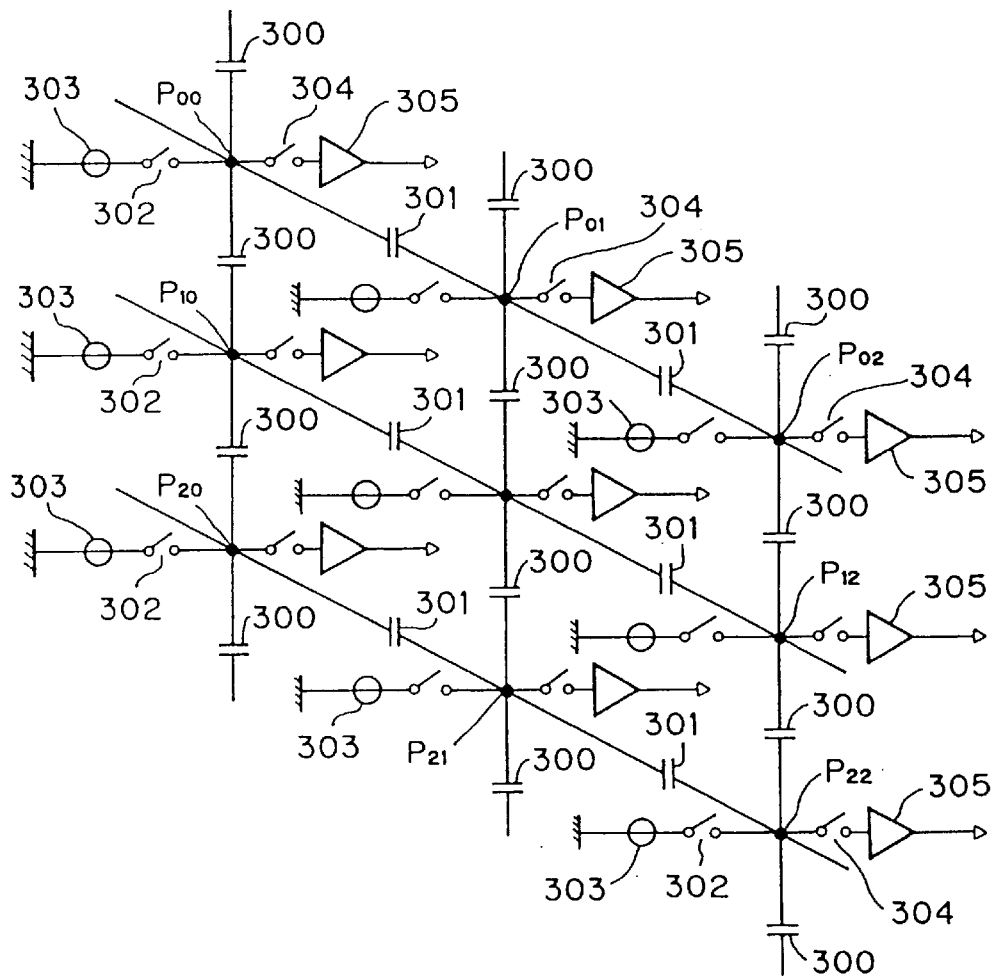
FIG. 3 is a circuit diagram of an example of the interpolation matrix of the image reproducing device of FIG. 2.

The structure of the interpolation matrix 214 will now be described with reference to FIG. 3. FIG. 3 diagrammatically illustrates a part of the interpolation matrix 214. As shown in this figure, the matrix has signal points Pij (only P00 to P22 are shown in the figure) arranged in a matrix and equal in number to the pixels of the CCD image sensor 101. In this case, those signal points which adjoin in the Y direction are interconnected, for example, by capacitive impedance elements 300, 300, . . . and those signal points which adjoin in the X direction are similarly interconnected, for example, by capacitive impedance elements 301, 301, . . . . The signal points Pij are connected on one hand through switches 302, 302, . . . to luminance voltage holding means 303, 303, . . . shown as circles, respectively, and connected on the other hand through switches 304, 304, . . . to buffer amplifiers 305, 305, . . . , respectively.

Figure 4:
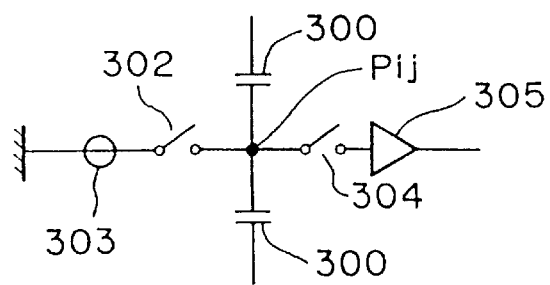
FIG. 4 is a circuit diagram showing a part of the interpolation matrix of FIG. 3.
Figure 5:
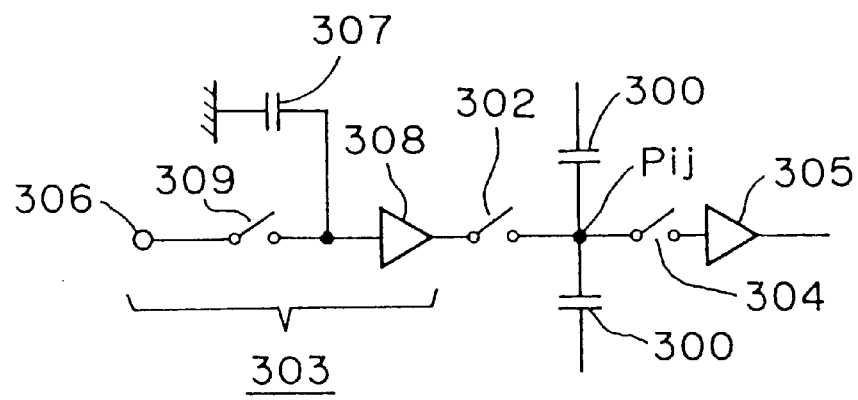
FIG. 5 is a circuit diagram showing in detail the circuit of FIG. 4.

A circuit portion of the above-described interpolation matrix 214 relating to one signal point Pij such as one shown in FIG. 4 will be described in more detail with reference to FIG. 5. As shown in FIG. 5, each luminance voltage holding means 303 comprises a terminal 306 connected to the relevant data line of the matrix 214, a capacitor 307 connected to the ground at one end thereof, a buffer amplifier 308 and a switch 309 which is driven by the relevant Y1 and X1 selection line of this matrix to connect the terminal 306 to the other end of the capacitor 307 and an input terminal of the buffer amplifier 308. If this luminance voltage holding means 303 corresponds to a significant pixel, the capacitor 307 then holds a luminance voltage of the significant pixel. An output terminal of this luminance voltage holding means 303, i.e., an output terminal of the buffer amplifier 308, is connected through another switch 302 to be closed by the relevant Y1 and X1 selection lines to the signal point Pij. This signal point Pij is further connected through a switch 304 to be closed selectively by later-described Y2 and X2 selection lines to an input terminal of a second buffer amplifier 305.

Referring again to FIG. 2, shown at 230 is a read control circuit for reading luminance voltages of all the pixels of a picture including the interpolated luminance voltages. Outputs of the read control circuit 230 are supplied to the Y2 drive circuit 231 and the X2 drive circuit 232. These drive circuits drive the Y2 selection lines and X2 selection lines of the interpolation matrix 214, respectively. Therefore, the switches 304 (see FIG. 3) connected to the respective signal points Pij are sequentially closed by outputs of the Y2 and X2 drive circuits 231 and 232.

Each output terminal of all the buffer amplifiers 305 of the interpolation matrix 214 is connected to a respective one of pixel electrodes (not shown) of a liquid crystal display matrix 234 of the conventional structure. This kind of liquid crystal display matrix can be formed, by means of known technique, on the same substrate on which the interpolation matrix 214 is formed.

With the above structure, when a picture is taken by the CCD 101 shown in FIG. 1, digital image data representing luminance of each pixel of the taken picture is stored in the image memory 104. Then, positions of significant pixels representative for example of a contour of an object in the picture and of those pixels distributed at equal intervals are detected from these stored digital image data by the two-dimensional quadratic differential filter 107, the threshold circuit 108 and the fixed-position information generating circuit 112. The address data of these detected positions are stored in the second image memory 110 together with the corresponding image data. These image data and address data are then coded and transmitted.

The above transmitted image and address data are reproduced in the memory 207 shown in FIG. 2. Based on these image and address data, luminance voltages represented by the image data are then applied to the relevant signal points Pij in the interpolation matrix 214. In this case, luminance voltages interpolatingly generated by the impedance elements 300 and 301 will appear at the remaining signal points. The luminance voltages thus generated for all the pixels are applied to the corresponding pixel electrodes in the liquid crystal display matrix 234, respectively, whereby the picture is reproduced.

In the above-described embodiment, the fixed-position information generating circuit 100 is provided in the camera device 100 in order to derive the pixels at the positions distributed over the picture at equal intervals as significant pixels. It may, however, be possible to provide alternatively or in combination therewith a noise generation circuit 400 shown by a broken line in FIG. 1 to add a small amount of noise to the image data fed to the two-dimensional quadratic differential filter 107. Furthermore, the impedance elements 300 and 301 in the interpolation matrix 214 are not necessarily be capacitive elements but may be resistive elements.

In the above-described embodiment, the output terminals of the interpolation matrix 214 are connected to the corresponding pixel electrodes of the liquid crystal display matrix 234, respectively. The output signals of the interpolation matrix 214 may alternatively be supplied to any kind of display device. For example, the output terminals of the interpolation matrix 214 can be combined into one signal line to transmit a serial luminance signal to an appropriate display device through the signal line.

Figure 6:
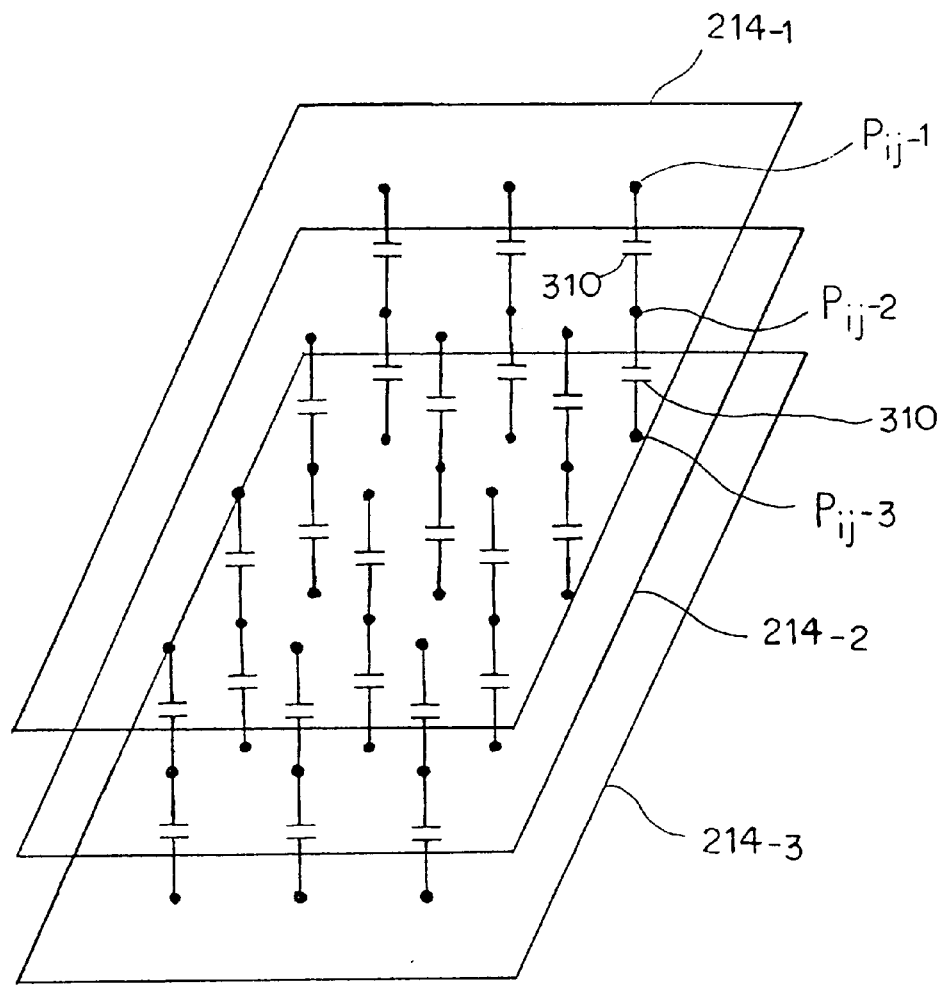
FIG. 6 is a diagrammatic illustration showing one example of a three-dimensional interpolation matrix according to the present invention.

The above description was made such that the image data compressed and expanded is of a two-dimensional image. The present invention can however be applied in a similar manner to the case where a three-dimensional image is compressed and expanded. FIG. 6 diagrammatically illustrates, as such an example, a three-dimensional interpolation matrix. This interpolation matrix comprises three layers of interpolation matrices 214-1, 214-2 and 214-3 each of which is substantially equivalent in structure to the matrix 214 shown in FIG. 3. In this case, each signal point Pij in one layer of interpolation matrix is connected through an impedance element similar to the element 300 or 301 in FIG. 3 to the corresponding signal point Pij in the adjacent layer of interpolation matrix. In the figure, a signal point Pij-1 in the upper layer 214-1 is connected through a capacitive element 310 to the corresponding signal point Pij-2 in the intermediate layer 214-2, and this signal point Pij-2 is similarly connected through another capacitive element 310 to the corresponding signal point Pij-3 in the bottom layer 214-3. The same is true for the other signal points. This type of multilayer matrix device can easily be formed by means of the conventional semiconductor integration technique.

In operation, the three layers are given luminance voltages of significant pixels of three consecutive pictures (two frames before, one frame before and current, for example), respectively.

With this structure, a more accurate interpolation of image data can be realized.

A preferred embodiment of the invention is summarized as follows. An image data compression/expansion system capable of compressing/expanding image data at a high speed and less costs is provided. The system comprises an image data compression device provided with extraction means for extracting, from pixel information of an image composed of pixels, characteristic data each representing a characteristic value such as a luminance and a color difference of a pixel which is of significance for the image and a position data of such a significant pixel, and comprises an image data expansion device which interpolatingly forms characteristic data of all the pixels of the image from the characteristic and position data of the significant pixels. The image data expansion device comprises an interpolation matrix 214 having signal points Pij interconnected through impedance elements 300, 301 and characteristic data supplying means responsive to the position and characteristic data fed from the image data compression device for supplying these characteristic data to those of the signal points Pij which are indicated by the position data, respectively, so that the characteristic data all of the pixels which have been formed by the interpolation are obtained at the respective signal points Pij of the interpolation matrix.

I claim:

1. An image data compression/expansion system comprising:

means for receiving pixel information of an image constituted by a predetermined number of pixels;

an image data compression device having extraction means for extracting, from the pixel information, characteristic data representing characteristic values of those pixels whose number is substantially less than the predetermined number and each of which is significant as compared to its surrounding pixels and position data of these significant pixels; and an image data expansion device for interpolatingly forming characteristic data of all the pixels of the image from the characteristic and position data of the significant pixels;

wherein said extraction means further extract characteristic data representing characteristic values of those pixels of the image, which are two-dimensionally distributed over the image at predetermined constant intervals from one another and whose number is substantially greater than 4 but less than the predetermined number, and position data of these two-dimensionally distributed pixels; and wherein said image data expansion device comprises an interpolation matrix having signal points corresponding to respective ones of the predetermined number of pixels of the image and interconnected through impedance elements, and characteristic data supplying means responsive to the characteristic and position data fed from the image compression device for supplying the characteristic data to those of the signal points of said interpolating matrix which are indicated by the position data, so that characteristic data of all the pixels of the image are interpolatingly formed at the respective signal points of said interpolation matrix.

2. An image data compression/expansion system according to claim 1, wherein said impedance elements are resistive or capacitive.

3. An image data compression/expansion system according to claim 1, wherein said characteristic data are luminance data each representing a luminance of a respective one of the significant and two-dimensionally constantly distributed pixels.

4. An image data compression device for use in a system accordingly to claim 1.

5. An image data expansion device for use in a system according to claim 1.

6. An image data compression/expansion system comprising:

means for receiving pixel information of an image constituted by a predetermined number of pixels;

an image data compression device having extraction means for extracting, from the pixel information, characteristic data representing characteristic values of those pixels whose number is substantially less than the predetermined number and each of which is significant as compared to its surrounding pixels and position data of these significant pixels; and an image data expansion device for interpolatingly forming characteristic data of all the pixels of the image from the characteristic and position data of the significant pixels;

wherein said extraction means comprise a two-dimensional quadratic filter which sequentially receives the pixel information of the image in a predetermined order, a threshold circuit which detects, as said significant pixel, each pixel corresponding to the pixel information for which an absolute value of an output of said filter exceeds a predetermined value and a noise generating circuit for generating noises independently of the pixel information to introduce the thus independently generated noises into the pixel information to said two-dimensional quadratic filter to thereby cause randomly located ones of the pixels of the image to further be detected by said threshold circuit as significant pixels; and wherein the image data expansion device comprises an interpolation matrix having signal points corresponding to respective ones of the predetermined number of pixels of the image and interconnected through impedance elements, and characteristic data supplying means responsive to the characteristic and position data fed from the image data compression device for supplying the characteristic data to those of the signal points of said interpolating matrix which are indicated by the position data, so that characteristic data of all the pixels of the image are interpolatingly formed at the respective signal points of said interpolation matrix.

7. An image data compression/expansion system according to claim 6, wherein said impedance elements are resistive or capacitive.

8. An image data compression/expansion system according to claim 6, wherein said characteristic data are luminance data each representing a luminance of a respective one of the significant pixels.

9. An image data compression device for use in a system according to claim 6.

10. An image data expansion device for use in a system according to claim 6.

* * * * *